United States Patent [19]

Coburn

[11] Patent Number: 4,627,310

[45] Date of Patent: * Dec. 9, 1986

[54] RATIO SPEED ADAPTOR

[76] Inventor: Brian Coburn, 79 Bailey St., Lawrence, Mass. 01843

[*] Notice: The portion of the term of this patent subsequent to Aug. 20, 2002 has been disclaimed.

[21] Appl. No.: 766,928

[22] Filed: Aug. 19, 1985

Related U.S. Application Data

[63] Continuation-in-part of Ser. No. 408,135, Aug. 16, 1982, Pat. No. 4,535,653.

[51] Int. Cl.[4] .................. F16H 57/10; F16H 3/44; F16H 1/28; B25B 17/00
[52] U.S. Cl. .................................... 74/763; 74/765; 74/770; 74/801; 81/58.3; 81/57.31; 192/67 R
[58] Field of Search .................. 74/801, 789, 792, 770, 74/797, 421 R, 785, 781 R, 784, 765, 750 R, 762, 763; 81/58.3, 57.31, 57.11; 192/67 R, 95, 114 R; 279/1 A

[56] References Cited

U.S. PATENT DOCUMENTS

| | | | |
|---|---|---|---|
| Re. 29,993 | 5/1979 | Wagner | 81/57.31 X |
| 2,252,967 | 8/1941 | Forton | 74/421 R |
| 2,950,634 | 8/1960 | Clark et al. | 74/801 |
| 3,134,275 | 5/1964 | Davison | 74/789 |
| 3,272,246 | 9/1966 | Bohnet | 81/58.3 |
| 3,756,095 | 9/1973 | McCoy, Jr. et al. | 74/801 |
| 4,334,440 | 6/1982 | Fonck | 74/789 |
| 4,341,293 | 7/1982 | Acevedo | 81/58.3 X |

FOREIGN PATENT DOCUMENTS 867602  5/1961  United Kingdom ............... 81/58.3

Primary Examiner—Kenneth J. Dorner
Assistant Examiner—Stephen B. Andrews
Attorney, Agent, or Firm—Edward A. Gordon

[57] ABSTRACT

The present invention discloses a speed transformer adaptor comprising an input shaft and an output shaft and a plurality of gear systems coaxially assembled within a casing. The gear systems individually comprise a rotatable member having a first portion forming an externally toothed sun gear and a second cylindrical portion having internal gear teeth. The externally toothed sun gear portion of each gear system is coaxially positioned within the cylindrical portion of the adjacent gear system. A pinion gear is disposed within the cylindrical portion of each gear system for engaging the sun gear and the internally toothed gear to transmit power therebetween. A clutch is provided and when not engaged allows the adaptor to function to provide high speed rotation of the output shaft with low speed rotation of the input shaft, and when slidably engaged allows the input shaft, casing, gear systems and output shaft to rotate in unison to provide a 1:1 input/output ratio. The adaptor is also reversible to provide a reduction in speed from the input speed of rotation to the output speed of rotation.

1 Claim, 6 Drawing Figures

RATIO SPEED ADAPTOR

FIELD OF THE INVENTION

This application is a continuation-in-part of my co-pending application Ser. No. 408,135, filed Aug. 16, 1982, now U.S. Pat. No. 4,535,653.

The present invention relates to speed transformers and more particularly to a reversible variable ratio speed adaptor for reducing or multiplying speed and torque input adapted for use with conventional manual or power operated power input devices and the like.

BACKGROUND OF THE INVENTION

The art of speed of rotation reduction or multiplication is manifold. Exemplary of such art are U.S. Pat. Nos. 3,453,906 to Junkichi; 3,320,828 to Grant; 2,053,130 to Chenne; and 3,792,629 to Appelbury. While such art is crowded it does not provide for a variable ratio speed adaptor which can be employed with or is adapted for use with existing power or manual rotary power input devices.

It is a desirable object of this invention to provide a reversible variable speed adaptor for reducing or multiplying speed and torque input and adapted for use with conventional, manual or power operated power input devices and the like.

Still another desirable object of the invention is to provide a variable ratio gear system adaptor which is easily manually operated to vary the ratio speed.

A still further desirable object of the invention is to provide a ratio adaptor in which the structure is simple and the operation is secure and positive.

A still further desirable object of the invention is to provide a ratio adaptor which is compact in size, easy to manufacture and low in cost.

The above and other desired objects, apparent from the drawing and following description, may be attained by the apparatus, construction, arrangements and combinations, subcombinations and parts which comprise the present invention, preferred embodiments of which are illustrative of the mode in which applicant has contemplated applying the principal, being set forth in detail in the following description and illustrated in the accompanying drawings.

SUMMARY OF THE INVENTION

The present invention discloses a ratio speed adaptor for reducing or multiplying speed and comprises an input shaft, an output shaft and a plurality of gear systems for transforming input speed wherein a first characteristic feature of the present invention resides in that the gear system comprise a first portion forming a drive shaft or sun gear, as the case may be, the sun gear having external teeth, and a second integral cylindrical portion having internal gear teeth. The sun gear of the next gear system is coaxially positioned within the cylindrical portion of the previous gear system with each system being coaxially rotatable. A pinion gear with external gear teeth is disposed within the cylindrical portion of each gear system to engagingly mesh with the external teeth of the sun gear and internal teeth of the cylindrical portion of the gear system to transmit the rotary motion therebetween. The last gear system is provided with a drive shaft instead of the cylindrical internally toothed gear portion.

A second characteristic feature of the invention is that the ratio speed adaptor is provided with a simple clutch structure to convert the speed adaptor from a high speed low torque transformer to a low speed high torque transformer.

A third characteristic feature of the invention is that the speed adaptor is also reversible to either multiply or reduce ratio speed.

A fourth characteristic feature of the invention is that in order to facilitate manufacture and assemblage, the input of one gear system is contained with the output portion of the adjacent system and are coaxially rotatable within a casing; in addition, the pinion gears of each system are supported within the casing by a very simple structure.

BRIEF DESCRIPTION OF THE DRAWING

For a fuller understanding of the nature and desired objects of this invention, reference should be made to the following detailed description taken in connection with the accompanying drawing, wherein like reference characters refer to corresponding part throughout the several views of the preferred embodiment of the invention and wherein.

DETAILED DESCRIPTION OF PREFERRED EMBODIMENTS

Figure 1:
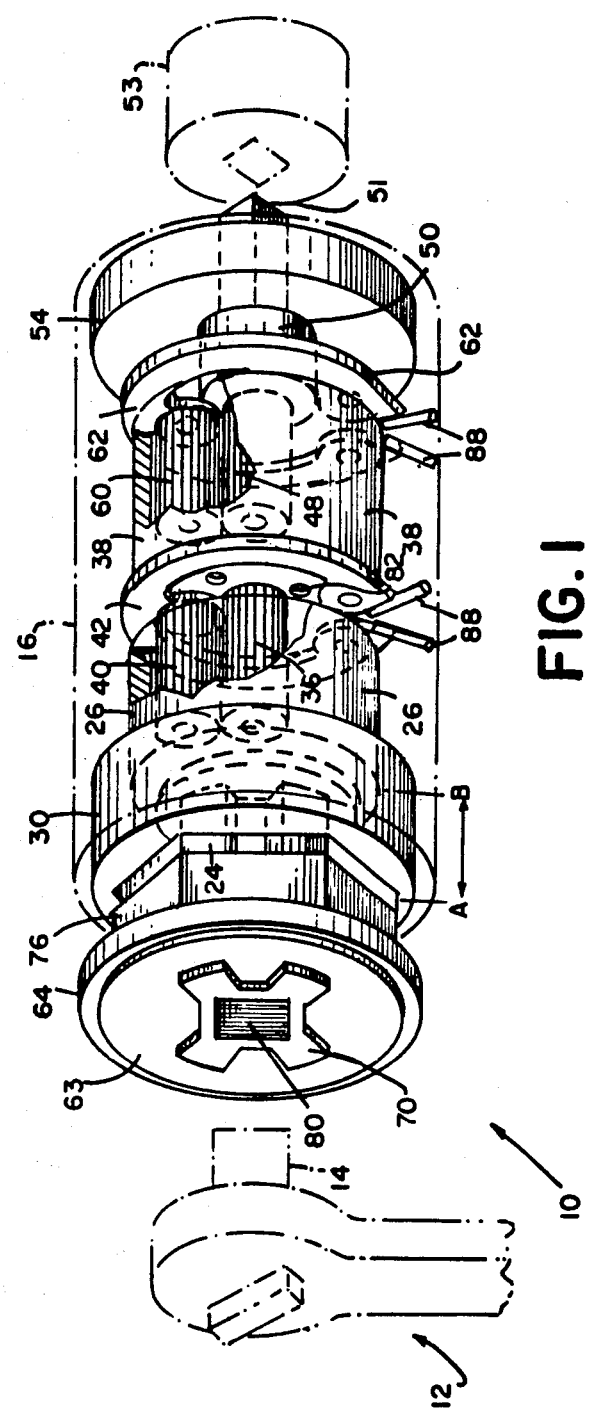
FIG. 1 is a perspective view of the ratio adaptor in the high ratio speed multiplyer position with the casing shown as transparent and illustrating its use with a conventional ratchet wrench and socket.

Referring now to the drawing and particularly to FIG'S 1 and 2, there is a ratio speed adaptor having a multi-stage structure shown generally at 10 and a source of motive power or input power shown at 12 as a ratchet wrench having a drive shaft 14. While illustrated as a manually operated ratchet wrench, the motive power may be any suitable manual, power operated, or other prime mover having a drive shaft 14 which is the input shaft for the ratio speed adaptor. The ratio speed adaptor 10 has a circular casing 16 having circumferential flanges 18 and 20. Disposed within the upper portion of casing 16 is gear 22 having as its upper portion and input drive shaft 24 and a rotating internally toothed gear 26 forming the lower portion.

Figure 4:
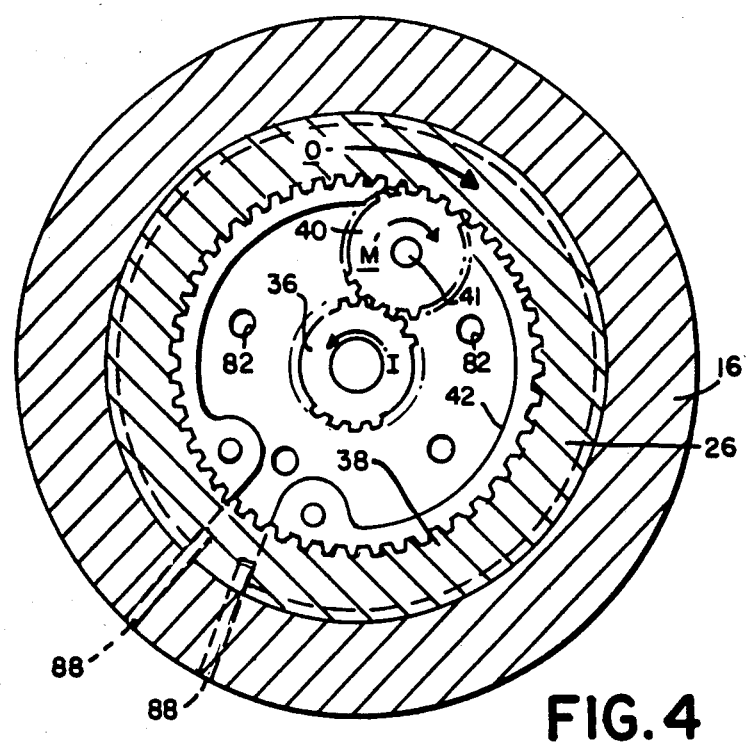
FIG. 4 is a cross section on the line 4—4 of FIG. 2.

It should be noted that, while shaft 24 is referred to in this embodiment as an input drive shaft, it may also serve as an output drive shaft as described in more detail hereinafter. Gear 22 is rotatable supported and is journaled in position within casing 16 by annular flange 28, annular retaining structure 30 and O-ring seal 32. Disposed with casing 16 and in line with gear system 22, is gear system 34 having as its upper portion a sun or pinion gear 36 and as its lower portion an internally toothed gear 38. Gear system 34 is rotatably supported and retained in position within casing 16 by annular flange 44 and support member 42. Gear 40, reference also being made to FIG. 4, is a stationary planetary or pinion gear mounted by means of a bore upon shaft 41 carried by support member 42 and is interposed in engaged relationship between both sun or pinion gear 36 and internally toothed gear 26.

Disposed within casing 16 is gear system 46 having as its upper portion sun or pinion gear 48 and as its lower portion output shaft 50 and extension 51. For purposes of the specification and claims gears 36 and 48 will be referred to as sun gears while gears 40 and 60 will be referred to as planetary or pinion gears. Gear system 46 is rotatably supported and journaled in position within casing 16 by annular end cover 54 and bearing casing 56 having ball bearings 58 and seal 52. The input shaft 24, pinion gears 36 and 48 and output shaft 50 are journaled within casing 16 in coaxial alignment to rotate about the same axis. Gear 60 is similar to gear 40 and is freely mounted by means of a bore upon shaft 61 carried by support member 62 and is interposed in engaged relationship between pinion gear 48 and internally toothed gear 38.

Figure 2:
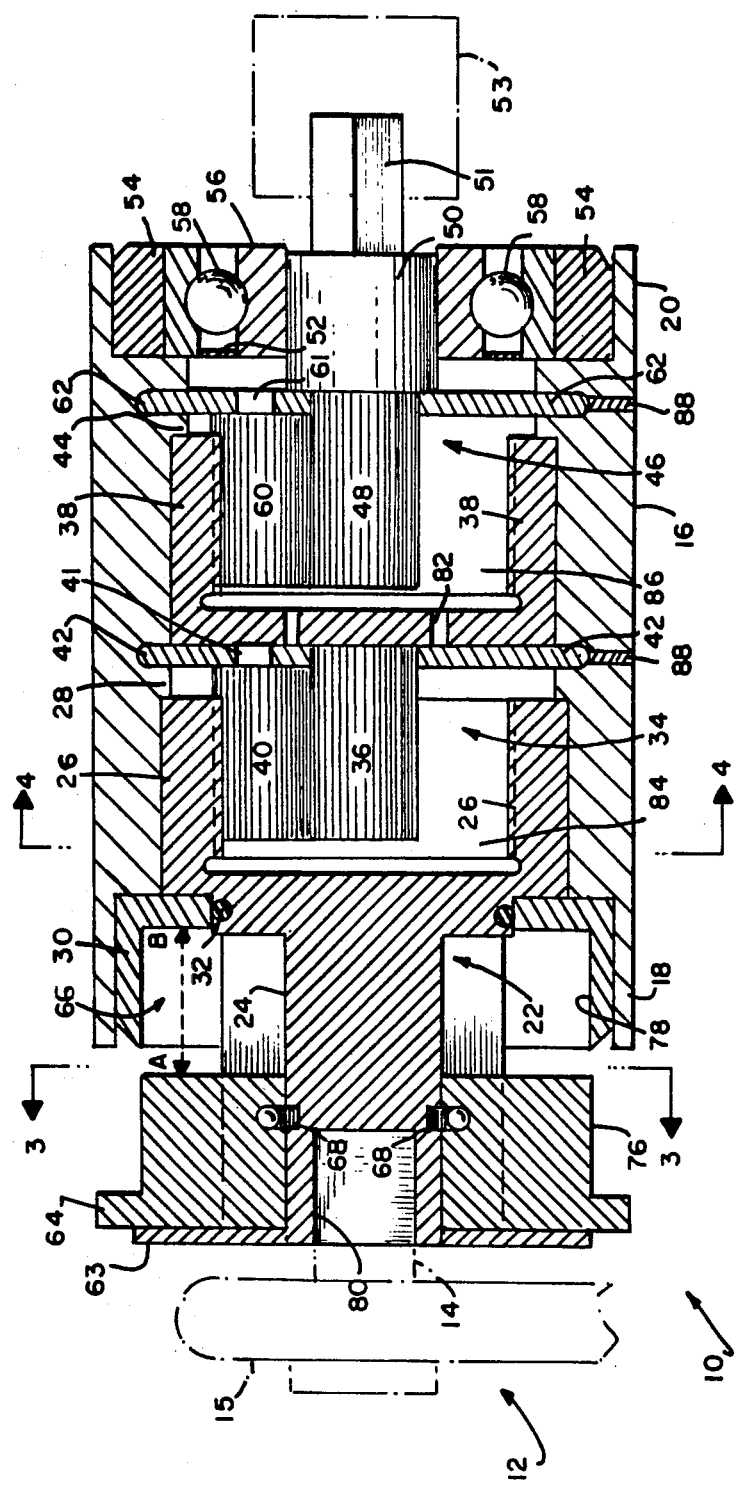
FIG. 2 is a cross-sectional view taken through the length of the embodiment of FIG. 1 and also illustrating the ratio adaptor in engagement with the ratchet wrench and socket.
Figure 3:
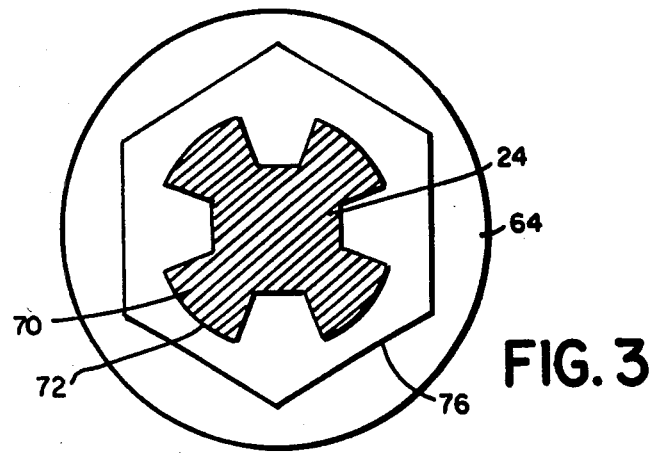
FIG. 3 is a cross section on the line 3—3 of FIG. 2.

The input shaft 24 which forms the upper portion of gear system 22 extends beyond flange 18 exteriorly of the adaptor as an entirety, the exposed end thereof having annular member 64 mounted thereon as can best be seen with reference to FIGS. 2 and 3. Annular member 64 is constructed to be slidably mounted on shaft 24 so that it may be moved into opening 66 and into engagement with the annular end retaining structure 30 and the casing 16 of the adaptor. As shown by the dotted arrows of FIG. 2, annular member 64 would be moved to position B to engage the main assembly of the adaptor and back to position A to disengage it from the main assembly. The annular member 64 serves as a "clutch," as will be discussed hereinafter with respect to the operation of the adaptor. In the preferred embodiment, means are provided for positioning the annular member 64 on shaft 24 when in its open or disengaged position. A suitable means is illustrated as spring loaded ball bearings 68. The shaft 24 is preferably configured to provide a plurality of splines 70 which mate with the center opening 72 of the annular member 64 thereby permitting relative longitudinal movement of the annular member on shaft 24 while preventing relative rotational movement with the shaft 24. Suitable means are provided to prevent annular member 64 from sliding off shaft 24 when disengaged and consists of a press fitted washer 63. The outer surface 76 of the annular member 64 is shown as hexagonal in configuration and mates with the inner surface 78 of the annular retaining structure 30, so that when the annular member 64 is moved to position B it will be locked in metal to metal contact with the annular retaining structure 30 and casing 16 to provide a continuous metal structure to transmit applied torque. The upper end of shaft 24 is provided with a suitably configured well 80 for reception of the drive shaft of the motive power illustrated as drive stud 14 of ratchet wrench 15. The support members 42 and 62 are suitably of snap-ring construction to simplify and facilitate assembly of the adaptor. In a preferred embodiment retaining pins 88 are provided to prevent the snap-ring supports from any rotation that may be caused by high torque forces.

In the preferred embodiment the ratio adaptor system may be lubricated with a suitable oil well known to those skilled in the art. In this case, the O-ring seal 32 and bearing casing seal 52 serve to retain the lubricant within the casing. Holes 82 perforate the upper surface of internal gear 38 thereby permitting the lubricant to circulate from chamber 84 to chamber 86.

Figure 5:
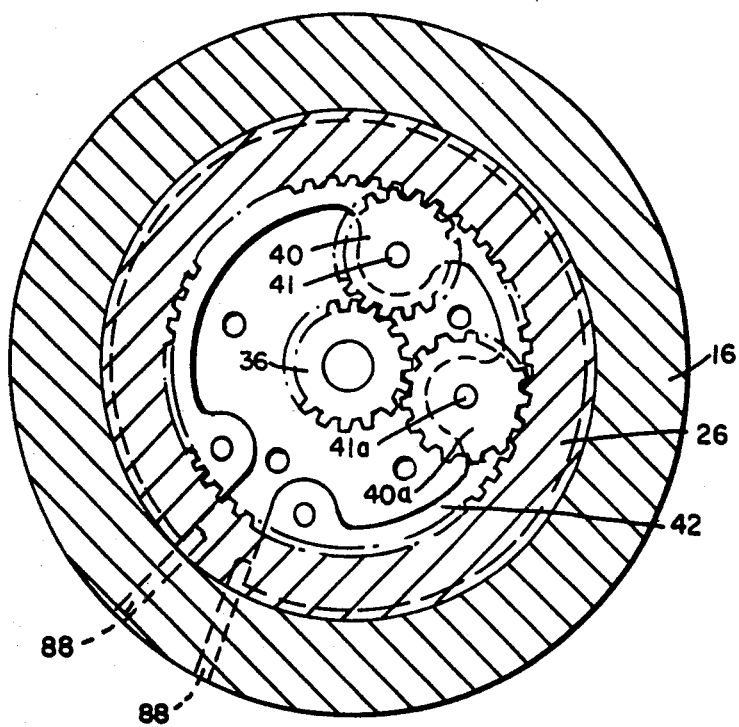
FIG. 5 is a modified embodiment of the gear system shown in FIG. 4.

Referring now to FIG. 5, there is illustrated a modified form of the invention wherein a second gear 40a similar to planetary pinion gear 40 is mounted by means of a bore upon shaft 41a carried by support member 42 and is also interposed in engaged relationship between sun gear 36 and internally toothed gear 26. In the same manner, a similar additional gear (not shown, but which would be the same as described and illustrated in the respect to gear 40a), and would be interposed between gear 60 and internally toothed gear 38. Such additional gears would provide for increased torque transfer accomodation.

While the invention has been described with respect to various embodiments it will be appreciated by those skilled in the art that variations may be made thereto without departing from the spirit of the invention.

For example, while the configuration of the outer surface 76 of the annular member 64 is described as hexagonal, the number of sides may be varied. The main requirements being a firm contact with the casing inner surface 78 and minimum rotation for engagement with the inner surface 78. With a hexagonal configuration engagement would require a rotation of not more than 60 degrees for engagement. Increasing the number of sides would reduce the degrees of rotation for engagement, but would increase the cost of construction.

The functions and operation of the ratio speed adaptor illustrated in FIGS. 1 through 4 will now be described. With the annular clutch 64 disengaged from the casing 16 (position A), and if for simplification we assume that the number of teeth of the internally toothed gears 26 and 38 is 30 for each gear; and that the number of teeth for each of the gears 36, 40, 48 and 60 is 10 then one rotation of the input shaft 24 will also impart one revolution to internally toothed gear 26. One revolution of internally toothed gear 26 will cause pinion gear 40 to make 3 revolutions. Three revolutions of gear 40 will cause sun gear 36 to make 3 revolutions and also 3 revolutions of internally toothed gear 38, which is an integral part of gear system 36. Three revolutions of internally toothed gear 38 will cause pinion gear 60 to make 9 revolutions, which, in turn, will cause output sun gear 48 to make 9 revolutions. Hence, an input of 1 revolution will be multiplied to provide an output of 9 revolutions. It can be appreciated that conversely, when shaft 50 is used as the input drive shaft and drive shaft 24 is the output shaft, the speed of the output shaft will be reduced to 1/9 of the input speed.

While using shaft 24 as the input shaft and with the clutch 64 at position A, then the speed at the output side, shaft 50, is multiplied by a ratio of 9:1, with the gearing assumed above.

Referring to FIG. 4 the relative rotation of the gears can be understood by reference, to arrows O, M and I. When internally toothed gear 26 is rotated clockwise as indicated by arrow O, pinion gear 40 also turns clockwise (arrow M) while sun gear 36 turns counterclockwise (arrowI). It can be appreciated that the rotation of internally toothed gear 38 which is integral with gear 36, will turn counter-clockwise as will gear 60 whereby gear 48 will turn clockwise, the same direction as the input rotations.

When it is desired to change ratios, the clutch 64 is moved to position B and into locking engagement with annular retaining structure 30 and thus casing 16. In this position, rotation of shaft 24 imparts similar rotation to casing 16 whereby the entire adaptor functions as a single solid unit, providing a 1:1 ratio whereby higher torque can be applied.

It is understood that in the construction of the device of the present invention, the reduction or multiplication ratios may be varied by varying the diametral pitches (tooth size), the numbers of teeth, and the diameters of the gears.

Figure 6:
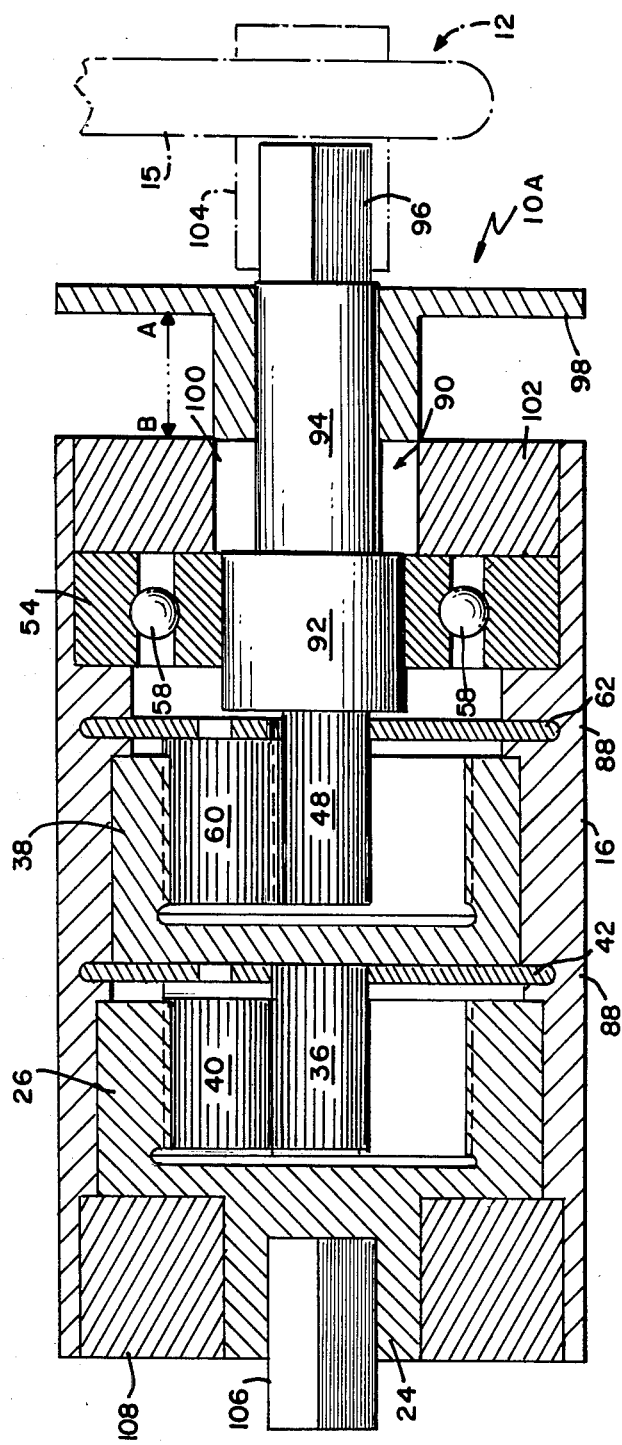
FIG. 6 is a cross-sectional view of an alternate embodiment of the invention as shown in FIGS. 1 and 2 and further illustrating a modified embodiment of the clutch assembly.

Referring now to FIG. 6 there is shown an alternate embodiment of the invention shown in FIGS. 1 and 2 and further illustrating a modified embodiment of the clutch assembly. In this embodiment of the invention the lower portion of sun gear 48 shown generally at 90 consists of an inner portion 92, a center portion 94, and an outer portion 96 and serves as the input shaft for the adaptor shown generally at 10A. Disposed about the center portion 94 of shaft 90 is annular clutch member 98 which is constructed to be slidably mounted thereon so that it may be moved into opening 100 and into locking engagement with the annular end retaining member 102 which is secured to casing 16. As shown by the dotted arrows, clutch members 98 can be moved from position A to position B to provide locking engagement with annular end member 102 and the casing 16. In this position the adaptor is "locked up" and provides a shaft to shaft ratio of 1:1. For example, input of one revolution applied to outer portion 96 of shaft 90 by input power through socket member 104 of racket wrench 12 results in an output of one revolution by shaft 106. The same input output ratio of 1:1 is provided when shaft 106 serves as the input shaft. Inner shaft 24 and outer shaft 106 are held in axial alignment by end retaining member 108 which is secured to casing 16.

When it is desired to change ratios the clutch member 98 is moved to position B thereby "unlocking" the adaptor 10A. In this position the adaptor operates in the same manner as adaptor 10 of FIGS. 1 and 2.

In this position, the adaptor 10A provides a ratio of 1:9 when the power flow is from shaft 90 to 106 and a ratio of 1:9 when the power flow is from shaft 106 to 90.

While the invention has been described with respect to preferred embodiments it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrated and not in limiting sense.

What is claimed:

1. A speed transformer adaptor comprising;
   a substantially cylindrical casing;
   a first gear system coaxially and rotatable positioned in fixed alignment within said casing comprising a first portion forming a first drive shaft extending beyond one end of said casing, and a second integral cylindrical portion having internal gear teeth;
   a second gear system coaxially and rotatably positioned within said casing and in fixed longitudinal alignment with said first gear system comprising a first portion forming a sun gear coaxially positioned within the cylindrical portion of said first gear system and having external gear teeth, and a second integral cylindrical portion having internal gear teeth;
   a first pinion gear disposed in fixed position within the cylindrical portion of said first gear system and meshing with said sun gear of said second gear system and said internal gear of the cylindrical portion of said first gear system;
   a third gear system coaxially and rotatably positioned within said casing and in fixed longitudinal alignment with said first and second gear systems comprising a first portion forming a sun gear coaxially positioned within the cylindrical portion of said second gear system and having external gear teeth, and a second integral portion forming a second drive shaft extending beyond the other end of said casing;
   a second pinion gear disposed in fixed position within the cylindrical portion of said second gear system and meshing with the sun gear of said third gear system and the internal gear of the cylindrical portion of said second gear system; and
   a clutch member slidably mounted on said second drive shaft of said third gear system and adapted to slidably engage said casing whereby to interlock said casing and gear systems to provide a direct drive between said first and second drive shafts.

* * * * *